Patented Oct. 8, 1929

1,730,514

UNITED STATES PATENT OFFICE

STANLEY ISAAC LEVY, OF LONDON, ENGLAND

TREATMENT OF IRON PYRITES

No Drawing. Application filed February 25, 1928, Serial No. 257,092, and in Great Britain February 10, 1928.

This invention relates to a process of treating iron pyrites for the recovery of sulphur and other valuable elements.

In the specification of a co-pending application, Serial No. 259,317 there is described a method of treatment whereby iron pyrites is heated in an inert atmosphere to drive off a considerable proportion of its sulphur and to yield a mainly soluble residue suitable for treatment with hydrochloric acid, producing sulphur in the form of $H_2S$, a copper-rich residue and ferrous chloride.

In accordance with the present invention I produce sulphur dioxide from which pure sulphur may be readily obtained and a mainly soluble residue which is more readily attacked by hydrochloric acid, by mixing with the iron pyrites to be treated a desired quantity of ferric oxide, and heating to a temperature which may be between 600–900° C. but is preferably between 800° C. and 900° C. The reaction proceeds according to the equation:

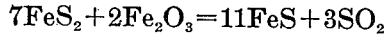

$$7FeS_2 + 2Fe_2O_3 = 11FeS + 3SO_2$$

This sulphur dioxide may be caused to react with the sulphuretted hydrogen obtained by treatment of the mainly soluble residue with hydrochloric acid, according to the equation

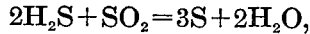

$$2H_2S + SO_2 = 3S + 2H_2O,$$

whereby pure sulphur is obtained instead of the crude material driven off when iron pyrites alone is heated.

The mainly soluble residue obtained by the present method is greater in quantity than that obtained from pyrites alone, but it is more readily attacked by hydrochloric acid, and the final copper-rich residue is usually less than is obtained from the mainly soluble residue obtained by treatment of pyrites without admixture with ferric oxide.

The proportion of ferric oxide admixed with the pyrites may be less than that required by the equation given, in which case some crude sulphur will be obtained in addition to the sulphur dioxide.

The ferric oxide used may be obtained by burning pyrites in the ordinary way, or by calcining the copper-rich residue obtained after the treatment with hydrochloric acid and extraction of the soluble copper and zinc salts as described in the specification of my co-pending application Serial No. 258,439 or by ignition of the ferrous chloride obtained in that process in a current of air with or without steam. The sulphur dioxide obtained in the preparation of this ferric oxide from fresh pyrites or from the copper-rich reisdue may be caused to react also with the sulphuretted hydrogen obtained from the mainly soluble residue, provided that the total proportion of sulphur dioxide so used is kept just below the ratio $SO_2 : 2H_2S$. Any copper, zinc, lead, etc., present in the ferric oxide used will be taken into the main cycle of operations, and recovered as described in applications Serial Nos. 259,317, 258,439 and 257,091.

I claim:—

1. A process of treating iron pyrites for the recovery of sulphur dioxide and other valuable elements, consisting in heating the iron pyrites in the absence of air with ferric oxide to form sulphur dioxide.

2. A process of treating iron pyrites for the recovery of sulphur and sulphur dioxide and other valuable elements, consisting in heating the iron pyrites in the absence of air with ferric oxide to form sulphur dioxide using a proportion of ferric oxide such as to obtain crude sulphur in addition to sulphur dioxide.

3. A process of treating iron pyrites for the recovery of sulphur and other valuable elements, consisting in heating the iron pyrites in the absence of air with ferric oxide to form sulphur dioxide reacting on the sulphur dioxide obtained with hydrogen sulphide to produce pure sulphur.

4. A process of treating iron pyrites for the recovery of sulphur and other valuable elements, consisting in heating the iron pyrites in the absence of air with ferric oxide to form sulphur dioxide using a proportion of ferric oxide such as to obtain crude sulphur in addition to sulphur dioxide and reacting on the sulphur dioxide obtained with hydrogen sulphide to produce pure sulphur.

5. A process of obtaining from iron pyrites a mainly soluble residue in a form suitable for the recovery of metals consisting in heating the iron pyrites with ferric oxide in the absence of air.

In testimony whereof I have signed my name to this specification.

STANLEY ISAAC LEVY.